Feb. 17, 1925.
C. E. FERREE ET AL
TACHISTOSCOPE
Filed Nov. 22, 1920
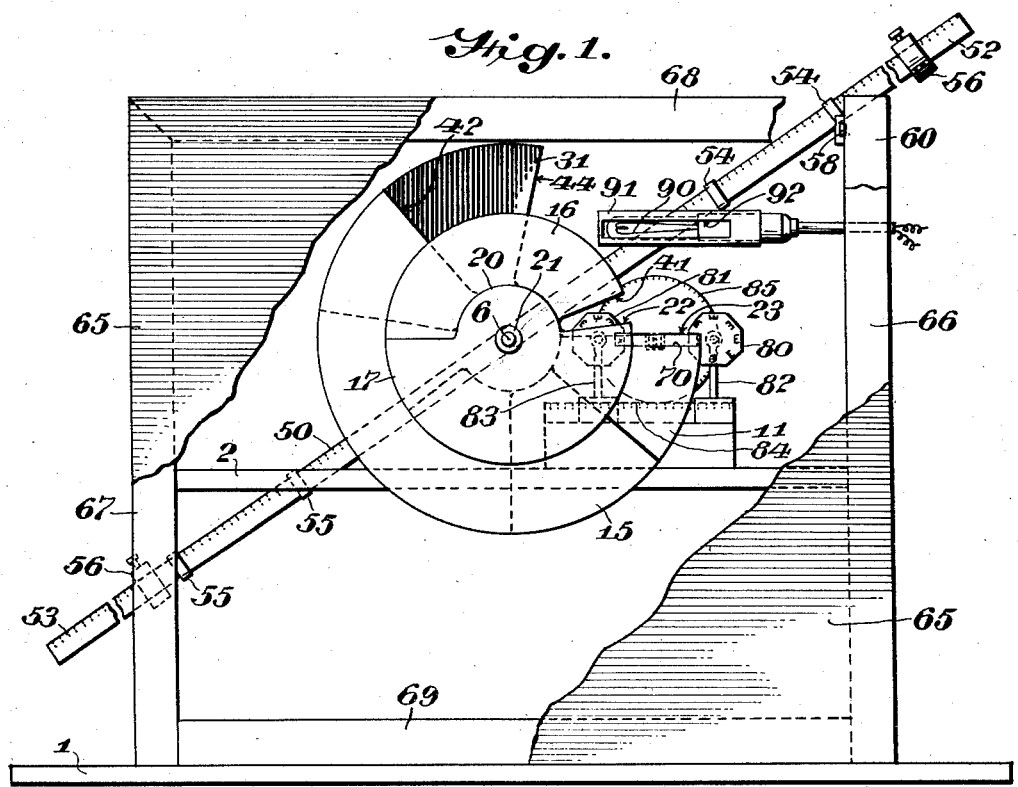
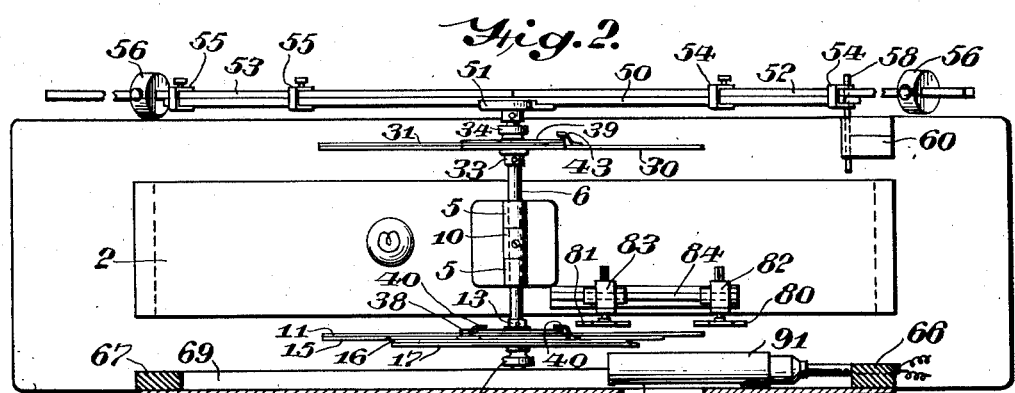
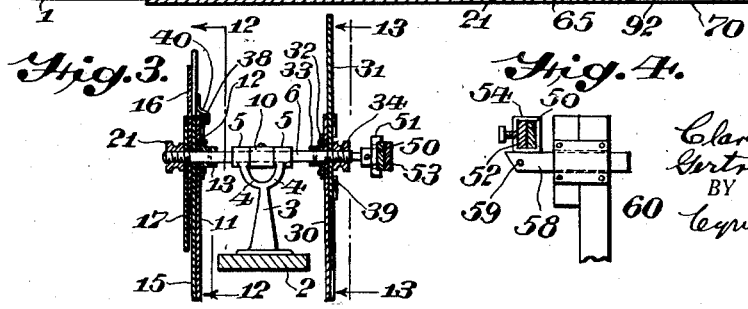
INVENTOR.
Clarence Errol Ferree
Gertrude Rand Ferree
BY
Cyrus N. Anderson
ATTORNEY.

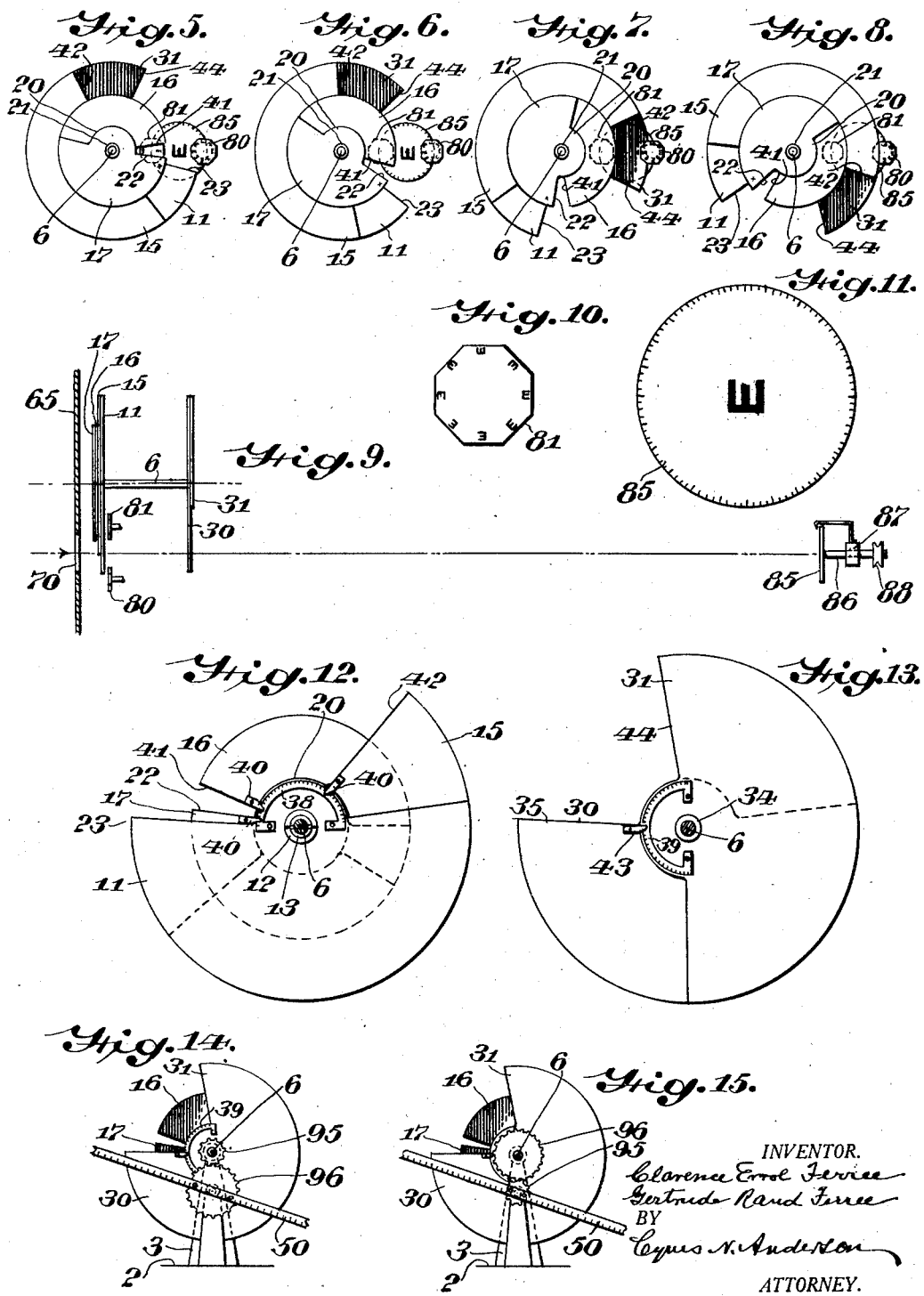

Patented Feb. 17, 1925.

1,526,781

UNITED STATES PATENT OFFICE.

CLARENCE ERROL FERREE AND GERTRUDE RAND FERREE, OF BRYN MAWR, PENNSYLVANIA.

TACHISTOSCOPE.

Application filed November 22, 1920. Serial No. 425,865.

*To all whom it may concern:*

Be it known that we, CLARENCE ERROL FERREE and GERTRUDE RAND FERREE, citizens of the United States, and residents of Bryn Mawr, in the county of Montgomery and State of Pennsylvania, have invented an Improvement in Tachistoscopes, of which the following is a specification.

Our invention relates to apparatus for investigating and testing the eyes of persons to ascertain and determine the lag in the adjustment thereof for clear seeing at different distances; in other words, the speed of adjustment of the eyes. It is very important in some vocations, such as aviation and locomotive engineering, that the eyes of those engaged therein shall be capable of quick and accurate adjustment in changing from near to far objects and from far to near objects. The adjustments, both of accommodation and convergence are involved as well perhaps as other adjustments which, however, will not be considered herein.

It is practically very important that the fitness of persons engaged in such pursuits or occupations shall be predetermined and we have invented and designed the present apparatus as a practical means for that purpose.

The principal object of our invention is to provide a simple, accurate and efficient apparatus by means of which the eyes of persons may be investigated and tested and their capacity or characteristic as to adjustment accurately and quickly determined.

A further important object of our invention is to provide means whereby the speed of adjustment of accommodation and convergence may be determined,—these being perhaps the most important factors to be considered in the case of persons desiring to engage in the ordinary pursuits such as aviation and locomotive engineering.

A further object of our invention is to provide an apparatus with means whereby by a movement or operation thereof the speed of adjustment from a near to a far object and from the latter to a near object may be determined. The parts of the apparatus may be so adjusted as to divide these two adjustments, or else the total time required in going from near to far and from far to near may be ascertained as may be preferred.

A still further object of our invention is to provide means whereby the speed of discrimination with the eye in adjustment for its object may be ascertained and determined.

A still further object of our invention is to provide means whereby the speed of accommodation alone apart from the adjustment for convergence may be ascertained and determined.

Without attempting to enumerate at this point all the various objects and advantages of our invention, we shall proceed with the detailed description thereof in which other and additional objects and advantages will be pointed out or else will be apparent from such description.

In order that our invention may be readily understood and its practical advantages fully appreciated, reference should be had to the accompanying drawings in which we have illustrated one form of mechanical embodiment thereof. However, it will be understood that our invention is susceptible of embodiment in other forms of construction than that which is shown in the drawings, and that changes in the details of construction may be made within the scope of the claims without departing from our invention.

In the drawings:

Fig. 1 is a view in front elevation of the apparatus, portions thereof being broken away in order that other parts may be more clearly disclosed;

Fig. 2 is a view partly in top plan and partly in horizontal section of the apparatus embodying our invention;

Fig. 3 is a central, vertical, longitudinal section of the same;

Fig. 4 is a view showing a detail of construction;

Figs. 5, 6, 7 and 8 are views in front elevation of certain of the parts of the apparatus shown in different positions from that in which they are shown in Fig. 1;

Fig. 9 is a view partly in top plan and partly in section showing a diagrammatic arrangement of the parts of the apparatus;

Fig. 10 is a view in front elevation of a near test disk;

Fig. 11 is a view in front elevation of a far test disk;

Fig. 12 is a transverse sectional view taken on the line 12—12 of Fig. 3;

Fig. 13 is a similar view taken on the line 13—13 of Fig. 3;

Fig. 14 is a view in rear elevation showing a modified construction of the apparatus; and Fig. 15 is a similar view showing a modification of the construction shown in Fig. 14.

Referring to the drawings: 1 designates the main base or support for the apparatus having thereon a basal member 2 at the center of which a standard 3 is situated having arms 4 at its upper end, which arms are provided with bearings 5 in which a shaft or axle 6 is rotatably supported. The said axle is held in fixed position longitudinally with respect to the said bearings by means of a sleeve or collar 10 secured thereto intermediate the bearings 5, the opposite ends of said sleeve or collar being in contact with the inner ends of the said bearings. At a point adjacent its front end the shaft or axle 6 is provided with a plurality of disks, four in the construction illustrated.

The rear disk 11 is secured by means of rivets to the annular flange 12 of a collar 13 which is fixedly secured to the shaft or axle 6. It will be seen, therefore, that the disk 11 is relatively fixed with respect to the shaft 6 and rotates only with the latter.

The disks 15, 16 and 17 are adjustably secured upon the said shaft or axle 6 in the order named and in contact with each other, and the first of said disks is in contact with the disk 11, as shown in Fig. 3 of the drawings. The said disks are rotatably adjustable. In forming the disks 11, 15, 16 and 17, segmental portions are removed as indicated, forming sector-shaped openings which, in the construction shown, constitute 172° of the surface of said disks. The width of these openings may, however, be varied or altered without departing from our invention. The cut away portions of the circular disks do not extend to the center thereof so that circular portions forming the inner edges of the said sector openings are left as indicated at 20 in Fig. 1 of the drawings. The disks 15, 16 and 17 are held in the positions to which they may be adjusted by means of a clamping nut 21 upon the front end of the shaft or axle 6. The disk 17 normally occupies the position shown in Figs. 1 and 12 of the drawings with its right hand edge portion 22 projecting above the adjacent edge 23 of the disk 11.

Secured to the opposite end of the shaft 6 from the disks 11, 15, 16 and 17 are disks 30 and 31 of like construction. All of these disks may consist of any suitable material, preferably a light metal, as aluminum. The disks 30 and 31 are more clearly shown in Fig. 13 of the drawings. The disk 30 is secured by means of rivets to the annular flange 32 of a collar 33 fixedly secured to the shaft 6, so that the said disk rotates only with the said shaft 6. The disk 31, which is supported in contact with and in parallel relation to the disk 30, is adapted to be adjusted and clamped against the said disk 30 by means of a clamping nut 34 upon the rear end portion of the said shaft 6. The right hand edge 35 of the disk 30 is in the same plane as that of the edge 23 of the disk 11.

Protractors 38 and 39 are secured to the respective disks 11 and 31, the said protractors being graduated, as shown. Each of the disks 15, 16 and 17 is provided with a pointer 40, the inner end portion of which projects over the protractor 38. By means of the presence of these pointers the adjustable disks 15, 16 and 17 can be accurately adjusted with relation to the disk 11.

The disk 17 once having been adjusted with respect to the disk 11 as shown in the drawings, it is permitted to remain in such position with its pointer 40 in alinement with a particular graduation mark upon the protractor 38. The other disks 15 and 16, however, may be adjusted so as to vary or change the angle made by the edges 41 and 42 thereof with the edges 22 and 23 of the disks 17 and 11. It is also apparent that the angular separation between the edges 41 and 42 and the edges 22 and 23 may be determined by reference to the said protractor.

As already stated, the disk 30 as in the case of the disk 11, is relatively stationary with respect to the shaft 6. This disk is provided with a pointer 43 which co-operates with the protractor 39 to indicate the angular relation between the edge 44 of the disk 31 and the edge 35 of the disk 30. This angular relationship being known, it is apparent that the angularity in degrees between the edge 44 of the disk 31 and the edges of any one of the disks 11, 15, 16 and 17 may be readily ascertained or determined.

At its rear end the shaft 6 is provided with a composite bar comprising a plurality of bars supported in adjustable relation with respect to each other. One of these bars 50 is secured in a rectangular seat 51 fixedly secured to the rear end of the said shaft. The bars 52 and 53 are adjustably secured by means of clamps 54 and 55 to the opposite ends of the bar 50. All of these bars are graduated. By loosening binding screws of the said clamps the bars 52 and 53 may be adjusted inwardly or outwardly with respect to the bar 50. Devices 56 of equal mass are adjustably secured to the adjustable bars 52 and 53 beyond the outer ends of the bar 50. When not in operation one end portion of the composite bar is adapted to be supported upon a slidable stop 58 movably supported upon the upper end portion of an upright 60 secured at its lower end to the base 1. To prevent the stop 58 from being disconnected from its support 60 when it is moved to release the said composite bar, we provide a pin 59 adjacent the rear end of such stop which is adapted to contact with the rear side of the support for the said stop, as is apparent from an inspection of Fig. 4 of the drawings.

In view of the fact that the stop 58, which acts as a stop to retain the composite bar with the shaft and the disks attached thereto in the positions indicated in Fig. 1, occupies a constant height, the said bar, shaft, etc. will at all times occupy identically the same position when the said bar is in contact with the said stop. This being the case, the revolution or movement of rotation of the said bar, shaft, etc. will always begin at the same point.

65 designates a screen situated as close as is practically possible to the front of the group of disks 11, 15, 16 and 17, which screen is supported upon a frame comprising sides 66 and 67 and top and bottom members 68 and 69. The screen is provided with a rectangular slot 70 situated with respect to the disks upon the shaft 6 in substantially the position as indicated by the rectangular shaped dot and dash line figure in Fig. 1.

Octagonally shaped test cards 80 and 81 are provided, which cards are rotatably supported upon the upper ends of posts 82 and 83 which in turn are adjustably supported upon a graduated bar 84 secured to the basal member 2. One of the purposes of providing the bar 84 with graduations or marks is to enable the re-positioning of the disks 80 and 81 in identically the same position formerly occupied thereby when a particular test was performed. Assume that a patient's eyes have already been tested and that it is desired to re-test them under exactly the same conditions; the test cards 80 and 81 may be re-placed in the same positions that they occupied in the previous test of such patient.

The respective test cards 80 and 81 are provided adjacent each edge at its exact center with a test letter E. These letters are so positioned that by rotating the cards the said letters can be presented all precisely at the same place and point, up and down, right and left, and the four corresponding 45° positions in any order that may be chosen. The far test object of the apparatus, consisting of the letter E in the illustration shown, is printed on a circular card 85 located a considerable distance, say six meters, in rear of the screen 65. This card 85 is supported upon a rotatable shaft 86 secured upon the upper end of a post 87. The said shaft 86 may be rotated by means of a cord, not shown, extending from a point near the front of the apparatus convenient to the party making the tests over a pulley 88. The circumference of this card 85, which turns immediately behind a pointer, is graduated in degrees to indicate the meridian into which the test letter E is turned.

For the purpose of illuminating the front surfaces of the test cards 80 and 81 upon which the E's are printed we have provided a cylindrically shaped tungsten filament lamp 90 supported a short distance above the said cards and above the slot 70, as indicated in Fig. 1 of the drawings. In order that the intensity of the light upon the test cards 80 and 81 may be varied, we have provided a hollow cylinder 91 which surrounds the light 90, which cylinder is provided with a rectangular slot 92. By turning the cylinder to different positions so as to vary the angle of incidence of the light rays on the reflecting screen 65, the intensity of the diffused light upon the front faces or surfaces of the test cards 80 and 81 may be varied. The surface of the test card 85 is likewise illuminated by means of a tungsten filament lamp, not shown. Upon movement of the stop bar 58 to release the composit bar previously referred to, and assuming that the weight 56 secured to the upper end portion of the said bar, having reference to Fig. 1 of the drawings, is situated a greater distance from the center of the bar than the other of said weights, the said bar, together with the shaft 6 and the disks 11, 15, 16 and 17, will immediately commence to rotate in unison or as a single system of motion, in view of the fact that they are all rigidly connected together. Such a system as is here disclosed operates as a compound pendulum and has all the characteristics and constancy of a compound pendulum. The length of exposure of the test objects, being the letter E in the construction shown, can be varied either by changing the width of the open sectors of the disks, as previously described, or by varying the positions of the weights upon the opposite end portions of the composit bar. As previously stated, these devices or weights are of equal mass, therefore the moment of turning of the system is governed, roughly speaking, by the two factors, namely, the distance apart of the said weights and the difference in the distance of the weights from the center of rotation; that is to say, the axis of the shaft 6.

It is apparent that by varying the difference of the distances of the two weights from the center of rotation the speed of rotation may be varied; likewise the speed of rotation of the shaft and the system of disks may be still further varied by varying the length of the adjustable composit bar.

It will be apparent, therefore, that the period of exposure of the test objects during the passage of the different sector-shaped openings across the same in front of the eyes of a patient, may be accurately adjusted to the finest shades by varying the positions of the weights 56 on the said composit bar or rod, by varying the length of the said bar and by adjusting the disks 15, 16 and 31 to vary the angular width or extent of the angles between the edges of the sector-shaped openings previously referred to and as described.

It may be noted that the illumination of the test cards 80 and 81 and 85 should be as nearly as possible identical or of equal intensity.

In Figs. 14 and 15 of the drawings we have shown additional means for controlling the speed of rotation of the shaft 6 and the system of disks thereon.

In Fig. 14 we have secured to the rear end of the shaft 6 a pinion 95 with which a larger gear 96 is in engagement. The bar 50 constituting part of the composit bar previously described is secured directly to the gear 96. The bar which is connected to this gear is provided with devices of equal mass or weight, as is previously described. By connecting the bar 50 as shown in Fig. 14 to the larger gear 96 and engaging the latter with the smaller gear 95, the speed of rotation of the shaft 6 and the disks supported thereon is considerably increased with respect to the speed of rotation of the said bar.

In Fig. 15 we have shown the position of the gears 95 and 96 reversed. In said Fig. 15 the relatively large gear 96 is secured to the rear end of the shaft 6, while the bar 50 is secured to the pinion or relatively small gear 96. It is apparent that by this means the speed of rotation of the shaft 6 and the system of disks secured thereto may be decreased with relation to the speed of rotation of the bar 50 under the influence of the weights 56 previously described.

It will be understood that in the use of the apparatus the eyes of the person being tested are situated adjacent and in front of the slot 70 in the screen 65 in position to see through the same. In carrying out the test the three test objects; that is, one of the E's on each of the test cards 80 and 81 and the E on the test card 85, and the eyes of the observer are adjusted to the same horizontal level and the two near test objects; that is, the two near E's, are separated just far enough to give the observer a clear view of the far object with either eye. In such position and before the test is started it will be seen that all of the test objects are concealed. The observer is instructed to fix his eyes upon a fixation object situated on the disk 17 as nearly as possible directly in front of the E immediately behind the same. This having been done, the stop bar 58 is withdrawn to release the composite bar previously described which is connected with the axle 6 and the said bar, together with the disks secured thereto, immediately begins to rotate under the influence of gravity. Immediately thereafter the opening between the edge 22 and the edge 41 of the disk 16 moves across the line between the eyes of the observer and the test object on the disk 81. Immediately after the passage of the opening between the edges 22 and 41 the near test object upon the card 81 is concealed by the disk 16. The observer then should look from the near test object to the far test object upon the test card 85. The period allowed for this purpose is that required for the disks to move through the angle between the edge 41 of the disk 16 and the edge 44 of the disk 31. The disk 31 operates to cut off the view from the far test object and the observer then moves his eyes to the near test object upon the near test card 80, which occupies a position in front of the right end of the slot 70, having reference to Fig. 1 of the drawings. As the disks continue to rotate the latter is concealed by the disk 15. The various disks should be so adjusted that the observer shall have sufficient time only to discriminate successively the near and far objects. This will give the angular distance of movement in degrees in which discrimination is effected ,which may be computed or measured in terms of time in any known manner or by any known means.

As above described, when both sets of disks, those secured to the front portion of the shaft and those to the rear portion thereof, are used, the period of movement of the eye from the near object to the far and back to near is divided. If it is not desired to divide this time into periods the disk 31 may be so adjusted as not to cut off a view of the far object prior to the time that the near object upon the test card 80 is cut off or concealed by the disk 15. In such case the eye, after the passage of the disk 16 in front of the near test object upon the test card 81, must move to the far object and back to the near object upon the test card 80 before or by the time the disk 15 moves into position to conceal the latter and at the same moment the far test object.

As before stated, the apparatus may be employed to ascertain and determine the speed of adjustment of accommodation of the eyes (which may be otherwise described as lag in the adjustment for accommodation) apart from the adjustment for convergence. In making this test the far test card 85 and the near test card 80 are adjusted or moved to the left. The space between the adjacent edges of the cards 80 and 81 should be just sufficient to leave the far test object visible by the eye, left or right, being tested which should be situated directly in rear of such space and in the same horizontal plane as the three test objects. The eye not being tested should be blindfolded. Thereafter the apparatus is rotated and the tests made in the manner above described.

It will be seen that we have provided a unitary structure by means of which successive exposures of a plurality of test objects may be made during or by the same system of motion.

It may be noted that while we have shown the disk 17 with its edge 22 in position to conceal the near test object upon the test card 81, the said disk 17 may be omitted and the relatively stationary disk 11 provided with a segmental portion corresponding with the portion of the disk 17 which projects above the edge 23 of the disk 11.

Having thus described our invention, what we claim and desire to secure by Letters Patent is:

1. In a tachistoscope, the combination of a plurality of stationary test objects with means moving with uniform speed for giving a single exposure of each of said objects in succession.

2. In a tachistoscope, the combination of a plurality of stationary test objects, rotatable means for effecting successively a single exposure of said objects, and means for causing rotation of said means with uniform speed.

3. In a tachistoscope, the combination of a plurality of stationary test objects with a plurality of devices for successively exposing said objects, each object being exposed but once, said exposures resulting from movements of the said devices, all of which movements constitute a part of the same system of motion.

4. In a tachistoscope, the combination of a plurality of stationary test objects, means for successively exposing said objects, and means for controlling the periods of said exposures, the respective objects being subjected to a single exposure only during the operation of the tachistoscope.

5. In a tachistoscope, the combination of a plurality of test objects comprising two near test objects and a far test object, means for exposing one of said near test objects for a relatively short period, the said other near test object and the far test object remaining exposed for a relatively long period, and means for simultaneously terminating the exposure of the said last two mentioned objects.

6. In a tachistoscope, a plurality of test objects comprising two near test objects and one far test object all arranged in the same horizontal plane, means for exposing one of the near test objects for a relatively short period, the other near object and the far test object being also exposed, means for terminating the exposure of one of the near test objects, means for thereafter terminating the exposure of the far test object, and means for thereafter terminating the exposure of the other near test object.

7. In a tachistoscope, the combination of a rotatable supporting member, means for causing rotation of said member, a plurality of stationary test objects positioned in operative relation to said rotatable member, and means carried by said rotatable member for effecting successive exposures of said test objects, the respective objects being subjected to a single exposure only during the operation of the tachistoscope.

8. In a tachistoscope, the combination of a plurality of test objects comprising a far test object and at least one near test object, a rotatable shaft having two groups of means thereon for effecting the successive exposures of said near and far test objects, one of said groups being secured to the front part of said shaft and the other group being secured thereto a distance in rear of the said front group, the near test object or objects being situated adjacent the rear side of the front group and the far test object being situated a distance in rear of the said rear group, and means for causing rotation of the said shaft and of the groups of means secured thereto.

9. In a tachistoscope, the combination of a plurality of test objects comprising a far test object and at least one near test object, a rotatable shaft having two groups of means thereon for effecting the successive exposures of said near and far test objects, one of said groups being secured to the front part of said shaft and the other group being secured thereto a distance in rear of the said front group, the near test object or objects being situated adjacent the rear side of the front group and the far test object being situated a distance in rear of the said rear group, means for causing rotation of the said shaft and of the groups of means secured thereto, and means for regulating and controlling the speed of rotation of said shaft and the said groups of means secured thereto.

10. A tachistoscope comprising a rotatable shaft, a couple of groups of disks thereon one of which groups is located at one end of said shaft and the other at the opposite end thereof, each disk having a part removed therefrom constituting an open sector, the disks of each group being relatively adjustable to vary the angles between the edges of said open sectors, means for causing a single rotation of said shaft and of the disks carried thereby, and test objects operatively related to said disks.

11. A tachistoscope, comprising a shaft, a plurality of groups of disks secured thereon, each of said disks having a part removed therefrom to provide an open sector, and the disks of each group being relatively adjustable to vary the angles between the edges of the sectors of the disks, means for causing a single rotation of said shaft and of the disks thereon, means for regulating and controlling the speed of such rotation, and test objects operatively related to said disks.

12. In a tachistoscope, the combination of a plurality of test objects, a rotatable shaft, a plurality of disks thereon, each of which is provided with an open sector, and the said disks being relatively adjustable, and means for causing rotation of said shaft and of the said disks to effect a single exposure of each of the said test objects in succession.

13. In a tachistoscope, the combination of a plurality of test objects, a rotatable shaft, a plurality of disks thereon, each of which is provided with an open sector, and the said disks being relatively adjustable, means for causing a single rotation of said shaft and of the said disks to effect in succession a single exposure of said test objects, and means for regulating and controlling the speed of such rotation.

14. In a tachistoscope, the combination of a plurality of test objects all situated in the same horizontal plane, means for successively exposing said objects, and a screen situated in front of and adjacent the front portion of the said means, said screen having an elongated slot therein in the same horizontal plane as the said test objects through which the said objects are observed by the person whose eyes are being tested.

15. An apparatus for investigating and testing eyes comprising, in combination, test objects which are stationary during the period of test, rotatable means for successively exposing said objects, and gravity actuated means for effecting rotation of said means.

16. In a tachistoscope, the combination of far and near test objects, two groups of rotatable means for successively exposing said objects, the near test object or objects being situated intermediate the said groups, and the far test object being situated a distance beyond the rear group, and means for effecting rotation of said means with a uniformly accelerated motion.

17. An apparatus for investigating and testing eyes comprising, in combination, test objects which are stationary during the period of test, rotatable means for effecting successively a single exposure of said objects, means for providing a force for causing rotation of said means, and means for releasing the said force providing means at all times from the same position.

18. An apparatus for investigating and testing eyes comprising, in combination, test objects which are stationary during the period of test, rotatable means for successively exposing said objects, means for providing a force to cause rotation of the said rotatable means, means for regulating and controlling the value of said force, and means for releasing the said force providing means from the same point at all times.

19. In a tachistoscope, the combination of a plurality of test objects, a rotatable shaft, means carried thereon for successively exposing said objects, a bar having operative connection at its center to the said shaft, and adjustable weights secured to the opposite end portions of said bar.

20. In a tachistoscope, the combination of a plurality of test objects, a rotatable shaft, means carried thereon for successively exposing said objects, a bar of adjustable length having operative connection at its center to said shaft, weights secured to and adjustable upon the portions of said bar on opposite sides of its connection with the said shaft.

21. In a tachistoscope, the combination of a rotatable shaft, two groups of disks secured thereon, one group being situated near the forward end thereof, and the other group at a point a distance in rear of the said first named group, each of the disks of the respective groups having segments removed forming open sectors therethrough, means whereby the disks of the respective groups may be rotatably adjusted with respect to each other, means associated with the said groups for determining the angles between adjacent edges of the said disks, means for causing rotation of the said disks, a plurality of test cards adjustably supported adjacent the rear side of the front group of disks, each test card having a number of test objects thereon, a test card situated a relatively great distance in rear of the rear group of disks, the respective test objects upon the near test cards being adapted to be placed in positions within the same horizontal plane as that of a test object situated at the center of the far test card, and an opaque screen situated adjacent the front side of the front group of disks, the said screen being provided with an elongated eye-slot situated in the same horizontal plane as the said near and far test objects.

22. A tachistoscope comprising a rotatable shaft, a plurality of disks thereon, the said disks being relatively adjustable and each of the said disks having a segment removed forming an open sector therethrough, a bar having operative connection with said shaft and extending transversely thereof, means whereby one end portion of the said bar may be caused to overbalance the other end portion thereof, and a stop for supporting and releasing the said bar at and from a certain fixed position.

23. In a tachistoscope, the combination of near and far test objects, a rotatable shaft, means for rotating the said shaft with uniform speed, two groups of means situated a distance apart on the said shaft, the rotation of which with the said shaft effects successive exposures of the said test objects, a screen situated adjacent and in front of the front group of means, said screen having an elongated eye-slot therein, the said slot being in the same horizontal level as the test objects to be looked at, and the said slot being of a length to permit both eyes to look therethrough and see all of the said test objects, a source of illumination situated adjacent and in rear of and a distance above the said near test objects, and means for directing the rays of light from the said light source against the rear side of the said screen and for varying the angle of incidence of the said rays.

In testimony that we claim the foregoing as our invention, we have hereunto subscribed our names this 20th day of November, A. D., 1920.

CLARENCE ERROL FERREE.
GERTRUDE RAND FERREE.